United States Patent [19]

Logan et al.

[11] Patent Number: 5,042,935
[45] Date of Patent: Aug. 27, 1991

[54] BLANKS FOR MAKING PRESCRIPTION EYEGLASS LENSES

[75] Inventors: David J. Logan, Glastonbury; Leonard G. Rich, West Hartford, both of Conn.

[73] Assignee: Gerber Optical, Inc., South Windsor, Conn.

[21] Appl. No.: 540,107

[22] Filed: Jun. 19, 1990

Related U.S. Application Data

[62] Division of Ser. No. 23,473, Mar. 9, 1987, Pat. No. 4,989,316.

[51] Int. Cl.$^5$ .......................... G02C 7/02; G02C 5/00; G02B 3/00
[52] U.S. Cl. ..................................... 351/159; 359/642; 351/154
[58] Field of Search ................. 351/159, 154; 350/409, 350/432-435

[56] References Cited

U.S. PATENT DOCUMENTS

4,070,103  1/1978  Meeker ................................. 351/154
4,537,732  8/1985  Ueda et al. ........................... 351/159

Primary Examiner—Scott J. Sugarman
Attorney, Agent, or Firm—McCormick, Paulding & Huber

[57] ABSTRACT

In a method and apparatus for making a lens for a pair of prescription eyeglasses a lens blank is shaped and finished on one of its major surfaces through the use of a machine controlled by the prescription information and with a new expendable lap being made each time a new lens is wanted. A machine for cutting a lens blank and/or a lap blank is controlled in three axes by a set of point data related to and obtained in response to the input into the control system for the machine of prescription information. Lap blanks and lens blanks usable by the machine are distinguishable from one another by each lap blank, or each lens blank, having an anomaly, such as a piece of magnetic material detectable by a sensor or the blank is rotated by the machine.

5 Claims, 3 Drawing Sheets

BLANKS FOR MAKING PRESCRIPTION EYEGLASS LENSES

CROSS REFERENCE TO RELATED APPLICATION

This application is a divisional application divided from co-pending application Ser. No. 07/023,473 filed on Mar. 9, 1987 and entitled Method and Apparatus for Making Prescription Eyeglass Lenses now U.S. Pat. No. 4,989,316.

BACKGROUND OF THE INVENTION

This invention relates to methods and apparatus for shaping a surface on an eyeglass lens blank to cause the blank to satisfy a given prescription, a lens thereafter being cut from the blank and fitted into a frame in combination with another such lens to provide a pair of prescription eyeglasses, and deals more particularly with such a method and apparatus wherein with the aid of a data controlled machine a new, expendable and inexpensive lap, for finishing and possibly shaping a lens surface on a lens blank, is produced each time a new lens is wanted. Still more specifically the invention relates to lens blanks and lap blanks for use with methods and apparatus such as aforesaid.

A common procedure in making a lens for a pair of prescription eyeglasses is to provide a lens blank, of glass or plastic, having two major lens surfaces. One of these surfaces is then cut with a cup shaped grinding wheel to give it a shape causing the blank, except for the surface quality of the cut surface, to have characteristics fairly closely approximating those of the prescribed lens. The cut surface is then further shaped through the use of a lap to cause the blank to still more closely approach the prescribed characteristics. After the worked lens surface is brought to the proper shape it is then brought to a polished condition using the same lap as used for the shaping. In some instances some of the refining of the surface quality may occur simultaneously with the shaping.

A typical machine for shaping and polishing a lens surface through the use of a lap, as described above, is shown, for example, by U.S. Pat. No. 3,893,264.

In the above described known procedure the lap surface determines the final shape of the worked surface of the lens blank. To be able to produce a lens blank satisfying any randomly given reasonable prescription it is necessary for the optical lab oratory, or other lens-making facility, to have available an extremely large inventory of relatively expensive differently shaped reusable laps so that when presented with a given prescription a lap having the proper shape will be at hand for use. Even so, it is often impossible to provide a lap perfectly suiting each possible prescription and in making a lens it thus often becomes necessary to use a lap having a not quite perfect shape. Or, as a corollary to this the characteristics given in a prescription can be specified only in steps the fineness of which is determined by the extent of the lap inventory. An eyeglass prescription at the present time commonly specifies, for each lens, values of "sphere", "cylinder" and "prism". When cylinder is specified for a given lens the worked surface of the lens blank in its finished state should be toric in shape. One reason for relying on a lap to control the end shape of the worked surface is that so-called "toric generators" commonly used to cut the worked surface, and Which use cup shaped cutting wheels, fail to cut truely toric surfaces and include in the cut surface an "elliptical" error subsequently removed by the lap. That is, the lap removes a non-uniform thickness layer of material from the worked surface to bring that surface to, or at least closer to, the desired toric shape.

Furthermore, at the present time prescription eyeglass lens-making procedures and apparatus are substantially limited to producing lens surfaces the complexity of which do not exceed that of a toric surface. It is likely, however, that if a means were available to produce lens surfaces of more complex shape lenses with such surfaces might better suit the individual requirements of some eyes and might be prescribed in the future. The above discussion applies both to single vision lenses and multifocal lenses. However, in comparison to the production of a single vision lens, the making of a multifocal lens requires the stocking of a large inventory of lens blanks having differently powered and differently configured multifocal segments so that a blank with the proper multifocal segment to fill a given prescription can be selected from the inventory. Each multifocal lens blank has a multifocal segment formed on one of its major surfaces and in producing a lens from the blank in accordance with present practice, the opposite major surface of the blank is worked to give the blank characteristics satisfying the prescription.

The general object of the invention is to provide a method and apparatus for making a prescription eyeglass lens from a lens blank, by shaping and finishing one surface of the blank, which permit a lens to be made more economically then by presently known procedures.

In keeping with the forgoing object, a more specific object of the invention is to provide a lens making apparatus and method wherein the need for a lens maker to maintain a large and costly inventorY of shape defining laps is avoided, thereby reducing the capital required for setting up a lens making facility and avoiding the trouble and expense involved in selecting, removing and returning laps from and to their storage locations.

A further object of the invention is to provide a method and apparatus for making a prescription lens whereby the characteristics given by the prescription may be specified to a finer degree, and the lens be made to meet such finer specifications, than is presently generally the case.

Another object of the invention is to provide a lens making apparatus and method whereby shapes more complex then that of a toric surface, if desired, may be given to a lens surface to more closely match the resulting lens to an individual eye. Allied with this object is that of being able to cut a lens blank to include prism, if desired, in the finished lens without having to decenter or otherwise adjust the lens blank in the cutting or finishing machines as is currently usually necessary. That is, a feature of the invention is that most or all desired surface shapes, including those with prism, can be obtained with a standard uniform mounting of each lens blank in the involved machines.

Another object of the invention is to provide a lens making apparatus and method of the forgoing character wherein a single cutting tool may be used to cut lens surfaces of a wide range of curvature, thereby avoiding the necessity inherent in many present machines of having to use differently sized cutters for cutting surfaces with different degrees of curvature.

Another object of the invention is to provide an apparatus and method of the forgoing character which permit the cutting and finishing of a lens surface including a multifocal segment, thereby permitting a multifocal lens to be produced from a lens blank having initially two plain spherical or other nonsegmented surfaces.

A prime object of the invention is to provide lens blanks and lap blanks especially useful with the aforesaid methods and apparatus for making prescription eyeglass lenses.

Other objects and advantages of the invention will be apparent from the following description of preferred embodiments of the invention taken in conjunction with the accompanying drawings.

SUMMARY OF THE INVENTION

The invention resides in an apparatus and method for making a prescription eyeglass lens from a lens blank wherein one of the two preformed major surfaces of the blank is cut and finished to cause the blank to satisfy a prescription and wherein the shape of the worked surface is defined by using the prescription information itself to control the operation of a data controlled cutting machine which cuts a surface of the desired shape either directly onto the lens blank or onto a lap blank or onto both a lens blank and a lap blank.

The invention also resides in a three-axis cutting machine using a spherical cutting tool for cutting a surface such as aforesaid on a lens blank and/or on a lap blank under the control of prescription related input data.

Most specifically, the invention resides in lap blanks and lens blanks usable in the aforesaid apparatus, method and machine.

DESCRIPTION OF THE PREFERRED EMBODIMENTS

The invention embraces a number of specific methods a common feature of which is the generation of a new lap each time a new lens is wanted with the lap having a surface shape dictated by the prescription information given for the lens. This lap surface may, depending on the involved method, be formed directly on a lap blank or may be formed by first producing a prescription related surface on a lens blank and then using that lens blank surface to define the lap surface. In other methods a prescription related surface may be formed directly on both a lap blank and a lens blank. In all methods the lap is then used to at least polish the worked surface of the lens blank.

Figure 1:
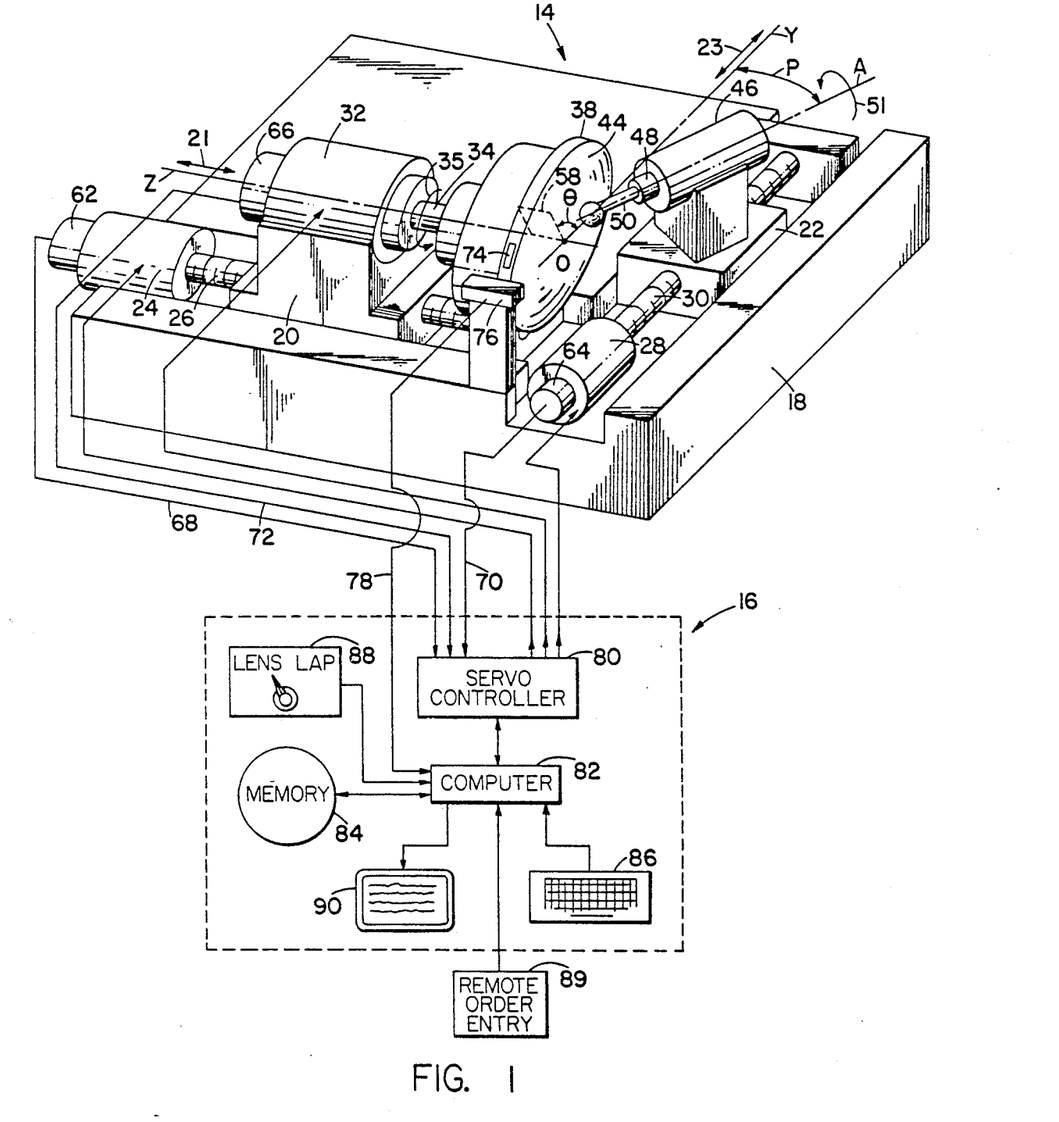
FIG. 1 is a view showing a three-axis cutting machine and associated control system embodying the invention for cutting a prescription related surface on a lens blank or a lap blank, the machine being shown somewhat schematically and the control system being shown in block diagram form, and the machine being shown in the process of cutting a lens blank.

Referring to FIG. 1, this figure shows a three-axis cutting machine 14 and related control system 16, embodying other aspects of the invention, which may be used to generate a prescription related surface on either a lens blank or a lap blank. The actual appearance of the machine 14 may vary widely, and in FIG. 1 the machine is shown somewhat schematically to illustrate principally its basic components and their interrelationships.

The cutting machine 14 includes a base 18, a first slide 20 and a second slide 22. The first slide 20 is supported and guided by the base 18 for translational movement relative to the base parallel to the illustrated Z axis as indicated by the arrow 21, and the slide 22 is supported and guided by the base for translational movement parallel to the illustrated Y axis as indicated by the arrow 23. The Y and Z axes are perpendicular to one another and intersect at the point or origin 0. The slide 20 is driven parallel to the Z axis by an associated servomotor 24 and lead screw 26, while the slide 22 is similarly driven parallel to the Y axis by an associated servo-motor 28 and lead screw 30.

Figure 2:
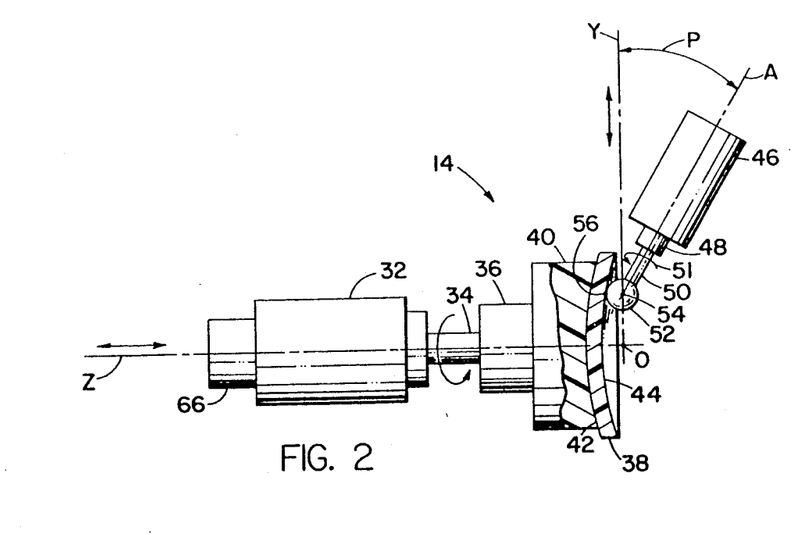
FIG. 2 is a plan view of a portion of the machine of FIG. 1 with part of the lens blank and the lens blank holding block being shown broken away to better reveal the cutting tool.

Referring to both FIGS. 1 and 2, the slide 20 of the cutting machine 14 supports a third servo-motor 32 having an output shaft 34 collinear with the Z axis. The motor 32 drives the shaft 34 about the Z axis as indicated by the arrow 35. Attached to the shaft 34 is a chuck 36 for releasably securing a lens blank or a lap blank to the shaft 34 during the cutting process performed by the machine. In FIGS. 1 and 2 a lens blank 38 is shown attached to the chuck 36 with such attachment being obtained through the intermediary of a block 40. The lens blank 38 initially has two major surfaces 42 and 44 both of which are usually spherical. In the illustrated case the surface 44 is cut and finished to give it a changed shape causing the blank to satisfy a given prescription. The unworked surface 42 of the blank is releasably bonded to the block 40 by any suitable known bonding technique customarily used for blocking purposes.

The eyeglass blank 38 may be made of glass or plastic, but in FIG. 2 is taken to be and is shown as plastic. The block 40 may be made of various different materials but preferably is made of plastic and is shown as such in FIG. 2.

The slide 22 carries a rotary cutter comprised of a drive motor 46, a chuck 48 and a cutting tool 50. The cutting tool has a spherical cutting surface 52 with a center of curvature 54 positioned on the Y axis. Because of the spherical shape of the cutting surface 52 the tool engages the desired surface to be cut on the blank at essentially a single point 56. The motor 46 is fairly high powered, for example of one horsepower or more, and rotates the tool 50 at a relatively high speed, for example 20,000 rpm or more, as indicated by the arrow 51, about an axis A passing through the center of curvature 54. Although not essential to the broader aspects of the invention, the axis A preferably and as illustrated in FIGS. 1 and 2 is located in the plane containing the Y and Z axes and is inclined from the Y axis by an angle P which is chosen in conjunction with the diameter of the spherical cutting surface 52 so that the tool, without replacement, can cut a wide range of different curvatures on the blank 38 without the shank of the tool interfering with the blank.

The exact nature of the cutting tool 50 may vary. For example, it may be a ball mill type cutting tool made entirely of metal and having a plurality of sharp cutting edges defining the spherical surface 52, or it may be an abrasive type tool such as one comprised of a metallic body having abrasive particles bonded to the body and defining the spherical cutting surface 52. Generally speaking, it will be selected to be the type best suited to cut the particular material of which the involved lens or lap blank is made. In any event, the diameter of the spherical cutting surface 52 is preferably within the range of 0.5 to 1.0 inch.

The machine 14 as illustrated and described above is referred to as three-axis machine since it provides for the controlled positioning of the cutting tool 50 in three coordinate axes relative to the blank mounted in the machine, thereby enabling the tool to generate or cut any reasonably shaped three dimensional surface on the blank. That is, any point on the desired surface can be defined in terms of three coordinates of a three-axis coordinate system fixed relative to the mounted blank, and these three surface point coordinates can be transformed into three tool point coordinates of the illustrated three coordinate system of FIG. 1 defining the related point which must be assumed by the center 54 of the tool to cause the cutting surface of the tool to engage and cut the blank at the lens surface point 56 in question. This transformation of axes takes into account the displacement between the center point 54 and cutting point 56 of the tool and is dependent on both the diameter of the tool and the curvature of the desired surface at the cutting point 56.

The three tool point coordinates of any given tool point are reproducible by the machine 14. One of these coordinates is a y coordinate measured parallel to the Y axis and is the displacement in that direction of the tool point in question from the origin 0 of the Y and Z axes. Another coordinate is a z coordinate measured parallel the Z axis and is the displacement in that direction of the tool point in question from the origin 0. The third coordinate is an angular coordinate 0 measured about the Z axis and is the angular displacement of the tool point in question from a reference plane 58 fixed relative to the blank 38 and containing the Z axis. It will also be understood that the surface cut on the mounted blank in response to the tool point data may be of any reasonable shape as required by the prescription and may indeed be a toric shape or even a more complex shape wherein the intersections of the surface with planes perpendicular to the Z axis are noncircular.

An eyeglass prescription, for each lens of a pair of eyeglasses, defines characteristics wanted in the finished lens. Given the particular material of which the lens blank is made (which determines its index of refraction and the curvature of the surface 42 which is to be left unworked, the prescribed characteristics dictate the shape needed to be given to the worked blank surface 44 in order for the lens blank to satisfy the prescribed characteristics. Thus, given a prescription for a lens, as stated for example in terms of "sphere", "cylinder", and "prism" values (or perhaps different and/or additional values), and given information as to the index of refraction and curvature of the unworked lens blank surface, the prescription information can be converted to a set of surface point data consisting of three coordinates for each of a large number of points located on and distributed over the desired surface, and therefore defining that surface. Once the surface point data defining the desired surface is at hand and also knowing the diameter of the spherical cutting surface 52 of the tool 50, the set of surface point data can be converted or transformed into a related set of tool point data consisting of three coordinates (y, z, and 0) for each of an identical large number of tool points which will result in the cutting of the desired surface on the lens blank if the center 54 of the tool 50 is moved one point at a time to such tool points. It therefore follows that the coordinate information defining the tool points can be used to control the machine 14 to cut a surface of the desired shape on the mounted blank.

Figure 6:
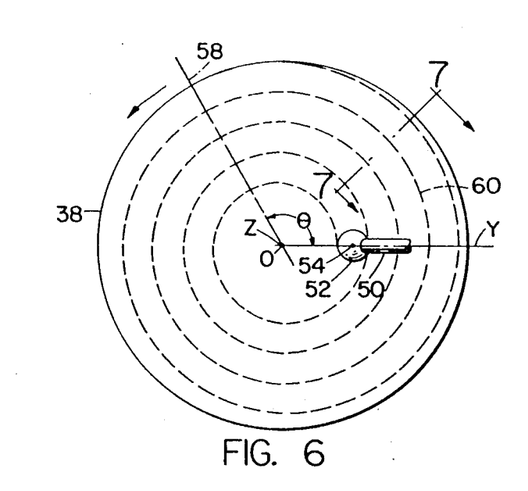
FIG. 6 is an elevational view taken looking toward the lens blank of FIG. 1 and shows the spiral path of movement of the cutting tool, the pitch of the spiral path being exaggerated for purposes of illustration.

Further, the tool points of the tool point data set, in accordance with another aspect of the invention, are arranged so as to fall in sequence along a given two dimensional tool path such as, for example and as illustrated in FIG. 6, a spiral path 60 in a tool path plane perpendicular to the Z axis. In the actual cutting operation of the machine 14 the tool is moved continuously and simultaneously in the two coordinate directions (y and 0) of the two dimensional tool path so as to move along such tool path; and during such movement adjustments, as needed, are made in the third (z) coordinate direction so that as the tool center 52 reaches the two coordinates ( y, 0) of a tool point in the tool path plane the third coordinate (z) of that point is also achieved at the same time by the tool center. Therefore, in the operation of the machine 14 in accordance with the invention a first step is to convert the information given by a lens prescription into a set of point data which can be used to control the machine and which will cause the machine to cut on the involved blank a surface of the desired shape. Such conversion of the prescription information to point data may be carried out using any one of a number of different algorithms, is well within the competence of a person skilled in the art, and is therefore not described here in detail. It should be noted, however, that in a method wherein both a lens blank and a lap blank for use in making the same lens are machined by the machine 14 the point data used for cutting the lens blank will be the same as used for cutting the lap blank except for being reversed so that the surface generated on one blank will be the complement of the surface cut on the other blank, and also except possibly for the introduction of an allowance to accommodate the thickness of a finishing pad to be attached to the surface of the lap blank as described hereinafter. This means that after the prescription information is converted into point data for use in controlling the machine to generate a surface on a lens blank, for example, the point data needed to control the machine to generate a lap blank surface can be easily obtained by a simple reversal of the point data used for generating the lens surface and by possibly introducing a simple correction for the thickness of a finishing pad.

To allow for its control in the positioning of the tool 50 the machine 14 includes encoders for each of its three positioning axes to provide information to the control system 16 as to the actual instantaneous position of the tool center point 54. These encoders are indicated respectively at 62, 64, and 66 in FIG. 1, are associated respectively with the servo-motors 24, 28 and 32 and are connected to the control system 16 through lines 68, 70 and 72. The lines 68, 70 and 72 therefore supply the control system 16 with signals representing respectively the z, y and 0 coordinates of the actual instantaneous position of the tool center point 54 in the illustrated coordinate system.

In cases where the machine 14 is used to machine both lens blanks and lap blanks some means is preferably provided to enable the machine to supply to the control system 16 a signal indicating the type of blank mounted in the machine. In accordance with one aspect of the invention such a means includes the provision of a distinguishing feature on the blanks of one type which is lacking on the blanks of the other type, and of a sensor on the machine for sensing the presence or absence of such feature on the mounted blank. By way of example, in FIG. 1 the lens blank 38 is shown to include a small tab 74 of magnetic material attached to or inset in its rim and the machine 14 includes a sensor 76 which detects the presence of the tab 74 as the blank 38 is rotated about the Z axis. In line with this implementation, all lens blanks to be used with the machine include a tab such as the one illustrated at 74 and all lap blanks to be used with the machine lack such a tab when a new blank is mounted in the machine 14 and the motor 32 first turned on to rotate the blank about the Z axis the signal produced by the sensor 76, and transmitted to the control system 16 over the line 78, will indicate to the control system whether the mounted blank is a lens blank or a lap blank.

The control system 16 for the machine 14 may vary widely as to its details, but basically and as shown in FIG. 1 it is comprised of a servo controller 80 (which may itself contain a microprocessor), a computer 82 and a computer memory 84. A means is also included for entering prescription information and other data which may be needed to allow the conversion of the prescription information to point data dictating generation of the proper surface on the involved blank. The exact nature of the data input means may also vary without departing from the invention, but in a typical case, and as shown in FIG. 1, it is either a local order entry means, such as a keyboard 86 and a mode selection switch 88, or a remote order entry system, computer or data link comprising a remote order entrY means 89. The selection switch 88 may be manually set to either a lens surface generation mode or to a lap surface generation mode according to whether the intention of the operator is to machine a lens blank or a lap blank. The structure and function of the selection switch 88 may be readily replaced by a key of the keyboard 86, by an entry routine using the keyboard 86 or by instructions from the remote order entry means 89, but it is shown separately in FIG. 1 for purposes of clarity. A readout means, such as a CRT display device 90 or the like, may also be included in the system to allow the computer to supply instruction and information to the operator.

In general the control system 16 of FIG. 1 functions as follows. Prescription information describing the characteristics of the lens to be generated is input to the computer 82 using the keyboard 86 or the remote order entry means 89. At the same time the operator or the remote entry means 89 also may enter additional data which may be needed to result in a lens of described surface shape and other characteristics. Such additional information may be the index of refraction of the blank material and the spherical curvature of its unworked surface 42. As an alternative, the system 16 may be set up so that after entry of only the prescription information the computer will process this information and supply a readout on the display device 90 describing to the operator the characteristics of the blank to be mounted onto the machine. As another alternative, if the machine 14 is to be used with only blanks of a standard uniform character it may not be necessary to enter any data describing the blank nor to instruct the operator as to the selection of the blank. If the machine 14 is to be used for cutting both lens blanks and lap blanks at some point before the actual cutting process begins the operator checks and adjusts, if necessary, the mode selection switch 88 to make certain it is set to agree with the type of blank intended. If set to the lens mode the tool point data fed by the computer to the servo controller is such as to cause the cutting of a surface on the blank mounted in the machine of a lens surface conforming to the input prescription information, and if the switch is set to the lap mode the tool point data fed by the computer to the servo controller is such as to cause the cutting on the blank mounted in the machine of a lap surface conforming to the input prescription information. As mentioned, the computer 82 receives from the sensor 76 signals indicating the type of blank mounted in the machine. These signals may be used to inhibit a cutting operation of the machine if when the mounted blank is first set into rotation the type of blank indicated by the sensor signals does not agree with the setting of the switch. That is, before a cutting operation begins the tool 50 is positioned radially outwardly beyond the outer edge of the mounted blank. Then when the machine is started the comparison of the sensor 76 output with the switch 88 setting is made immediately and the movement of the tool along the Y axis is inhibited before the tool reaches cutting engagement with the blank, in the event the comparison is unfavorable.

In an alternate way of using the sensor 76 the switch 88 is eliminated and the output of the sensor is used to control the type of surface cut by the machine. If the sensor detects the mounted blank as being a lens blank the computer is conditioned to supply tool point data to the servo controller causing the cutting of a lens surface, and if the mounted blank is detected to be a lap blank the computer is set to supply tool point data to the servo controller causing the cutting of a lap surface.

Figure 7:
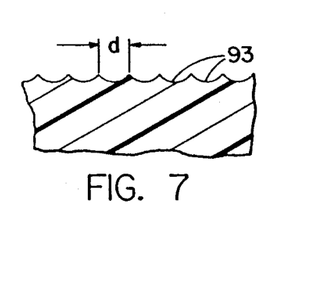
FIG. 7 is an enlarged fragmentary sectional view taken on the line 7—7 of FIG. 6.

The computer 82 then, with the aid of programs and information stored in the memory 84, converts the input prescription information to a set of tool point data describing the position of the center point 54 of the tool at points located along a spiral tool path in the plane of the Y and 0 axes, as shown in FIG. 6. The servo controller is then supplied with commands from the computer 82 causing the servo-motors 28 and 32 to operate continuously and at such coordinated rates as to cause the tool center point 54 to follow the spiral tool path 60 in the Y, 0 plane As mentioned, the commands are such that the cutting surface of the tool is initially located radially outwardly beyond the edge of the blank and is then moved continuously inwardly along the Y axis toward the origin 0. For at least the major portion of the movement of the tool from the outer edge of the blank to the origin 0 along the Y axis the Y axis and 0 axis movements are preferably coordinated so that the "pick" cut by the tool on the blank will have a constant value. The tool in moving along the tool path because of the spherical shape of its cutting surface actually cuts a shallow spiral groove 92 in the blank. As shown in FIG. 7, the "pick" is the spacing d between the crests of adjacent convolutions of the groove 92. The pick d taken in conjunction with the diameter of the tool cutting surface is therefore a measure of the quality of the surface cut on the blank by the tool preferably the rates of movement in the Y and 0 axe are coordinated so that the pick in the generated surface has a value of less then 0.030 inches, which means that the tool is moved along the Y axis at a rate of less then 0.030 inches per revolution of the blank about the Z axis.

The movements of the tool 50 in the Y and 0 axes are also preferably further coordinated so that at least along the major portion of the tool's radial movement from the outer edge of the blank to the origin 0, the blank has a substantially constant tangential velocity relative to the tool. This tangential velocity is preferably on the order of at least 200 inches per minute and more desirable is more than 300 inches per minute. The coordination of the movements is preferably such that the tool 50 is moved along the Y axis at a constant rate and the speed of rotation of the blank about the Z axis is varied as necessary to keep the tangential velocity of the blank relative to the tool at the desired constant value. The above mentioned coordination of the Y and 0 axis movements preferably holds throughout the movement of the tool from the outer edge of the blank to a point near the origin 0. However, as the tool nears the origin 0, say gets to within the last half inch adjacent the origin 0, both the speed of the tool along the Y axis and the speed of rotation of the blank about the Z axis may be reduced to bring the cutting process to a gradual end.

As the tool 50 is moved along the spiral tool path 60 by the coordinated continuous operation of the Y and 0 motors 28 and 32 the center point 54 of the tool is moved in succession to the tool points defined by the tool point data in the Y, 0 plane and as this movement in the Y, 0 plane takes place the Z axis servo-motor 32 adjusts the position of the blank 38 along the Z axis so that when the y, 0 coordinates of a given tool point are reached by the tool center the z coordinate of that point is also achieved by the tool center at the same time.

The conversion of the prescription information to a set of tool point data may be handled in various different ways depending largely on the power and capacity of the computer 82 and memory 84. In one case the conversion may be made by storing in the memory 84 a data base containing a multitude of individually selectable blocks of data each of which blocks of data contains point data defining, either directly or with slight modification, a surface corresponding to a specific set of identifying prescription information. In other words, for each acceptable combination of prescription values the memory contains an associated block of point data, and when a given prescription is input into the computer the corresponding block of point data identified by that prescription is withdrawn from the memory and used by the computer 82 and servo controller 80 to control the machine 14.

As an alternative to the foregoing, the memory 84 may be used to store a multitude of individually selectable blocks of data each of which blocks of data includes a plurality of control points located on a surface corresponding to a set of prescription information identifying such block of data, the control points further being located along a two dimensional tool path in the Y, 0 plane, such as along the spiral tool path 60 described above. When a given prescription is input to the computer the associated data block is retrieved from the memory. The control points of this data block are then used by the computer to generate the coordinates of additional data points falling between the control points. The point data so generated is then used by the computer and the servo controller to control the operation of the machine 14.

In yet another method of converting the input prescription information to point data the memory 84 does not store any blocks of point data or any blocks of control points but instead stores merely programs and further information with the help of which the computer 82 is able to originate a set of point data for controlling the machine 14 to generate the desired surface each time a new prescription is entered into the control system. This conversion is performed at sufficient speed as to allow the actual cutting operation of the machine 14 to begin as soon as or shortly after the prescription information is entered and to allow the machining to take place at a reasonably fast rate.

Regardless of the method used to convert the input prescription information to machine controlling point data, it is preferred that the control system 16 and the machine 14 be capable of operating at such speeds that following the entry of the prescription information the cutting of a blank will take place in less than one minute.

The machine 14, as described above, is used in the practice of the invention to provide a surface on a lens blank and/or on a lap blank having a shape accurately corresponding to a given randomly selected prescription. In further accordance with the invention a number of different methods making use of such an accurate surface, freshly generated each time a new lens is wanted, may be employed to arrive at a lens blank having characteristics satisfying the given prescription.

One method for using the machine 14 and control system 16 of FIG. 1 to produce a lens blank satisfying a randomly selected prescription is illustrated by FIG. 2, 3, 4 and 5. In this method the machine 14 is first used as shown in FIG. 2 to machine a surface 44 on a lens blank 38 to give the surface 44 a shape causing the lens blank 38 to have characteristics satisfying the prescription except for the surface quality of the machined surface 44. That is, immediately after its machining the surface 44 has a so-called "gray" surface quality and has to be further finished to bring it to a polished quality.

In the next step of the process the lens blank 38 is replaced in the machine 14 by a lap blank 92, preferably made of plastic, and the machine is used to cut a lap surface 94 on the lap blank 92 having a shape also accurately dictated by the input prescription information. The lap surface 94 is later used to finish the lens blank surface 44. If in this finishing procedure the lap surface 94 directly engages the lens surface 44 the lap surface 94 may be exactly the reverse or complement of the lens surface 44. If a finishing pad is to be attached to the lap surface in the finishing process the surface 94 created on the lap may be the reverse or complement of the lens surface 44 except for being compensated to allow for the thickness of the finishing pad. In either event, however, it will be understood that having obtained the point data needed to control the machine 14 to cut the lens surface 44 the same point data with only minor change may also be used to cut the lap surface 94.

Figure 4:
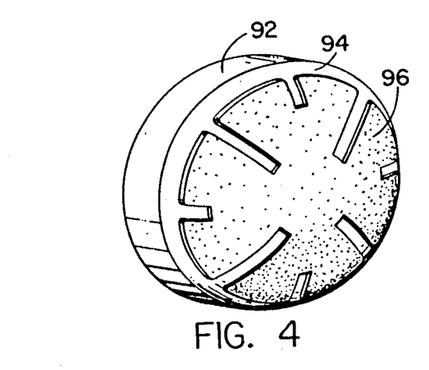
FIG. 4 is a perspective view showing the finished lap blank of FIG. 3 fitted with an abrasive pad.

After the lens blank 38 and the lap blank 92 have been cut to form thereon the gray lens surface 44 and the lap surface 94 the lap may be used to finish the gray surface 44 on the lens blank to bring it to a polished state without changing its basic shape. Preferably this is done, as shown in FIG. 4, by first adhesively attaching to the surface 94 of the lap blank 92 an abrasive pad 96 of standard well known construction. The degree of finishing required depends on the roughness of the gray lens blank surface 44. In some instances the quality of this surface after generation may be sufficiently fine that only a polishing step is required to bring it to a polished state. In this event the pad initially attached to the lap 92 may be a polishing pad containing a very fine polishing abrasive. However, to produce with the machine 14 a gray lens surface 44 of sufficiently fine surface quality that only a following polishing step is required usually means that a relatively long time need be devoted to the cutting of the surface 44. Because of this a more acceptable overall time for the production of a finished lens may usually be obtained by running the machine 14 under such conditions that the gray surface 44 cut on the lens blank has a degree of roughness requiring a prepolishing step in advance of the polishing step, in which prepolishing a coarser abrasive is used than in polishing. Therefore in such a case the pad 96 first attached to the lap 92 is a prepolishing pad, and after the prepolishing step this pad is removed and replaced by a polishing pad.

Figure 5:
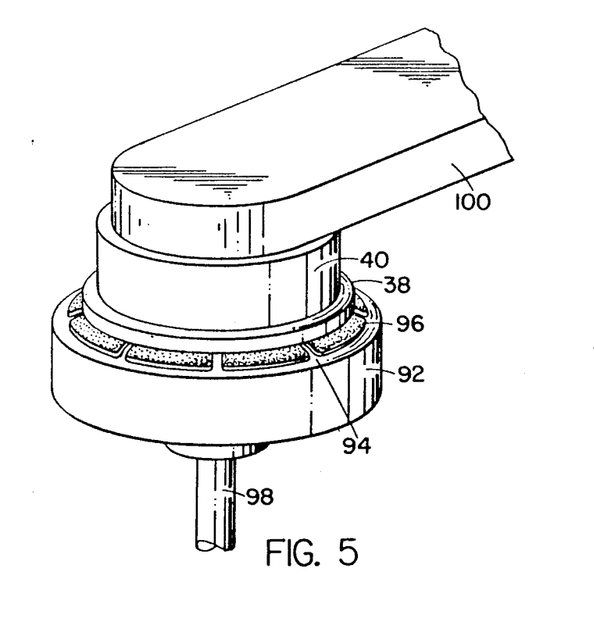
FIG. 5 is a perspective view showing the lap blank of FIGS. 3 and 4 being used in a finishing machine to finish the worked surface of the lens blank of FIG. 2.

After a pad 96 has been applied to the lap surface 94 the lap 92 and the lens blank 38, along with its block 40, are mounted, as shown in FIG. 5, respectively to the two arms 98 and 100 of a lapping machine which may be any one of a number of standard machines such as, for example, the one shown by the aforementioned patent 3,893,246. This lapping procedure does not change the basic shape of the lens surface 44 and gradually brings that surface to a polished state. Thus, after the polished state is achieved the lens blank will have the characteristics needed to satisfy the associated prescription and may be cut and edged in a conventional way to provide a lens for insertion into an eyeglass frame.

Figure 3:
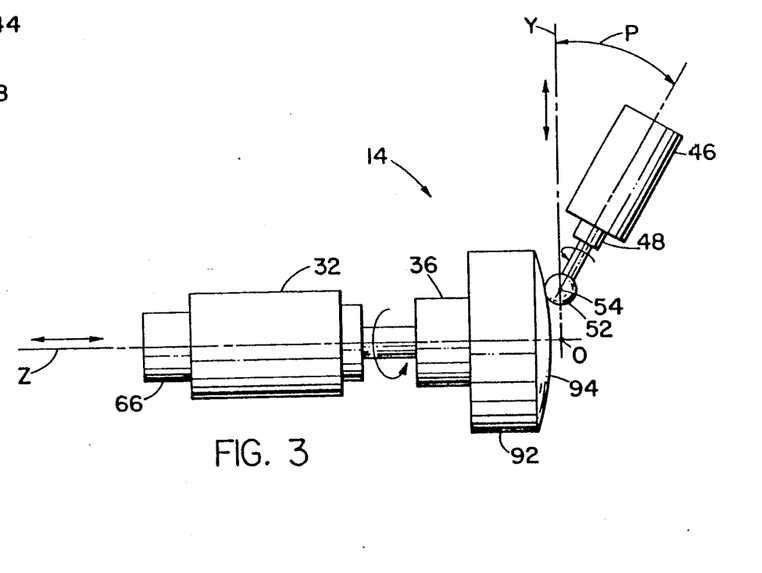
FIG. 3 is a view generally similar to FIG. 3 but showing the illustrated apparatus being used for cutting a lap blank rather than a lens blank.

In another method according to the invention the machine 14 and related control system 16 are used only, as represented by FIG. 3, to cut a lap surface 94 on a lap blank 92 each time a new lens is wanted. The lap so produced is then used in substantially the same way as laps have been used in the past to shape, refine and polish a surface on a lens blank—with the exception that after the shaping, refining and polishing steps are completed the lap is discarded and not saved for further use. More specifically, after the lap surface is generated in response to a randomly given set of prescription information it is matched with a lens blank having a lens surface to be worked. The lap and lens blank are then placed in a lapping machine and in a first rough grinding step a coarse abrasive pad is attached to the lap surface so that in the lapping process the lap shapes the lens surface to take on a shape reversed to that of the lap. In subsequent fining and polishing stages the worked lens surface is further refined, and possibly shaped, until brought to a final polished state with a shape conforming to that of the lap surface 94.

Figure 8:
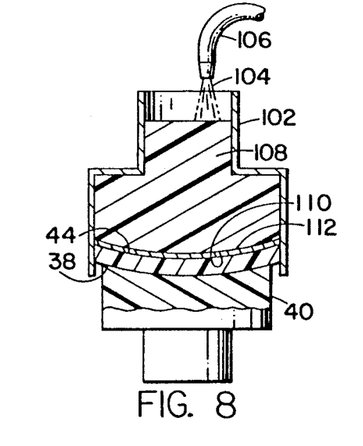
FIG. 8 is a view, partly elevational, and partly in section, showing an alternative method embodying the invention for making a lap.

In another method embodying the invention, the machine 14 and control system 16 may be used to provide on a lens blank an accurately shaped lens surface conforming to a given set of input prescription information. This accurate lens surface is then used to define a corresponding lap surface on a lap blank, and then the lap blank and lens blank are placed in a lapping machine and the lap used to bring the lens surface to a polished state without changing its shape. In this method various different schemes may be used for defining a surface on the lap blank conforming to the machined surface on the lens blank. One of such methods is illustrated in FIG. 8 and involves the use of the machined surface 44 of the lens blank as a mold surface in the formation of a molded lap. Referring to this figure, after the surface 44 is cut on the lens blank 38 the lens blank and the block 40 are oriented as shown so that the cut lens surface 44 faces generally upwardly. A hollow thin-walled mold structure 102 is then slipped over the edge of the lens blank 38 to the position illustrated and a liquid setable molding material 104 is then poured into the mold so formed, as by means of a nozzle 106, until the mold is filled to substantially the illustrated level. The material 104 may, for example, be a thermoplastic material heated to a liquid state prior to being introduced to the mold and which solidifies when cooled to room temperature. After the material does cool the result will be a rigid lap 108 having a lap surface 110 complementing the lens surface 44. If the lap 108 is to be used with an abrasive pad in the lapping process the lens blank 38 preferably has its surface 44 covered with a layer of sheet material 112, prior to the application of the mold structure 102, which sheet material 112 has a thickness equivalent to the thickness of the abrasive pad to be used with the lap. In this case the sheet material 112 is treated on both sides with release agents so that after the molding process it may be removed from both the lap 108 and the lens blank 38. In a slightly alternate procedure the sheet material 112 may itself be of an abrasive nature and designed so that in the molding step it becomes bonded to the lap 108 and thereby forms an abrasive surface on the lap 108 eliminating the need for a supplemental pad such as the pad 96 shown in FIG. 4.

In another method wherein a surface machined on a lens blank is used to define a lap surface, after the lens blank is machined to produce on it an accurately shaped gray surface an abrasive pad, such as the pad 96 of FIG. 4, is attached to the gray surface. The lens blank and an unshaped lap blank are then put into a lapping machine and moved relative to one another to cause the lens blank and its attached pad to abrade the lap blank and generate on the lap blank a lap surface complementing the lens blank gray surface, except for the pad thickness. The pad is then removed from the lens blank and a pad of similar thickness is attached to the lap surface. Then the lap and the lens blank are again placed in a lapping machine and removed relative to one another to refine and polish the gray lens blank surface to a finished condition. Of course both the abrading of the lap blank and the refining of the lens blank surface may be carried out, if necessary, in more than one stage with a change of pads between stages.

We claim:

1. A blank for being machined on a machine which produces on said blank a surface related to a given eyeglass prescription and whereby during the machining process said blank is rotated about a central axis, said blank having a side surface which is at least substantially a surface of revolution about said central axis, and a magnetic material means located along a line extending circumferentially of said blank about said central axis, which magnetic material means may accordingly be sensed once per revolution of said blank about said central axis by a sensor placed adjacent said line to distinguish said blank from one not having such a magnetic material means.

2. A blank as defined in claim 1 wherein said blank is a lap blank.

3. A blank as defined in claim 1 wherein said blank is a lens blank.

4. A blank for being machined on a machine which produces on said blank a surface related to a given eyeglass prescription and whereby during the machining process said blank is rotated about a central axis, said blank having a side surface which is at least substantially a surface of revolution about said central axis, said blank being made substantially entirely of plastic material, and a piece of magnetic material fixed relative to said blank and located at one point along a line extending circumferentially of said blank about said central axis, which piece of magnetic material may accordingly be sensed once per revolution of said blank about said central axis by a sensor placed adjacent said line to distinguish said blank from one not having such an anomaly.

5. A blank for being machined on a machine which produces on said blank a surface related to a given eyeglass prescription and whereby during the machining process said blank is rotated about a central axis, said blank having a side surface which is at least substantially a surface of revolution about said central axis, said blank also having a face which is machined by said machine to produce said surface related to a given eyeglass prescription and a rim portion extending circumferentially around said face and about said central axis, and a magnetic material means located along a part of said rim portion which magnetic material means may accordingly be sensed once per revolution of said blank about said central axis by a sensor placed adjacent said rim portion to distinguish said blank from one not having such a magnetic material means.

* * * * *